United States Patent
Mao (10) Patent No.: US 10,346,611 B1
(45) Date of Patent: Jul. 9, 2019

(54) DETECTING MALICIOUS SOFTWARE

(71) Applicant: Symantec Corporation, Mountain View, CA (US)

(72) Inventor: Jun Mao, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 41 days.

(21) Appl. No.: 14/952,716

(22) Filed: Nov. 25, 2015

(51) Int. Cl.
*G06F 21/56* (2013.01)
*H04L 29/06* (2006.01)

(52) U.S. Cl.
CPC .......... *G06F 21/56* (2013.01); *H04L 63/1416* (2013.01)

(58) Field of Classification Search
CPC ....................................................... G06F 21/56
See application file for complete search history.

(56) References Cited

U.S. PATENT DOCUMENTS

| | | | | |
|---|---|---|---|---|
| 7,853,578 B1* | 12/2010 | Anker | ...... | G06F 7/02 707/706 |
| 8,176,555 B1* | 5/2012 | Schreiner | ...... | G06F 21/566 726/23 |
| 8,621,233 B1* | 12/2013 | Manadhata | ...... | G06F 21/56 709/224 |
| 8,707,296 B2* | 4/2014 | Matthew | ...... | G06F 8/61 717/174 |
| 8,756,432 B1* | 6/2014 | Chen | ...... | G06F 21/565 713/187 |
| 8,850,570 B1* | 9/2014 | Ramzan | ...... | G06F 1/00 726/22 |
| 8,910,188 B1* | 12/2014 | Wang | ...... | G06F 13/00 719/318 |
| 9,021,260 B1* | 4/2015 | Falk | ...... | G06F 21/56 713/165 |
| 9,197,665 B1* | 11/2015 | Cabot | ...... | G06F 21/564 |
| 9,396,333 B1* | 7/2016 | Lee | ...... | G06F 21/564 |
| 9,450,960 B1* | 9/2016 | McCorkendale | ...... | H04L 63/10 |
| 9,489,513 B1* | 11/2016 | Mesropian | ...... | G06F 21/566 |
| 2004/0215754 A1* | 10/2004 | Orleth | ...... | G06F 9/4411 709/223 |
| 2006/0206936 A1* | 9/2006 | Liang | ...... | H04L 63/1416 726/22 |
| 2008/0168553 A1* | 7/2008 | Kiehtreiber | ...... | G06F 21/51 726/17 |
| 2009/0328212 A1* | 12/2009 | Repasi | ...... | G06F 21/55 726/23 |

(Continued)

OTHER PUBLICATIONS

Li, B., Roundy, K., Gates, C. and Vorobeychik, Y., Mar. 2017. Large-Scale Identification of Malicious Singleton Files. In Proceedings of the Seventh ACM on Conference on Data and Application Security and Privacy (pp. 227-238). ACM.*

(Continued)

*Primary Examiner* — James R Turchen
(74) *Attorney, Agent, or Firm* — Holland & Hart LLP (57) ABSTRACT

A method for detecting malicious software is described. In one embodiment, the method includes identifying an unknown application on mobile device, identifying a package name of the unknown application, analyzing the package name of the unknown application in relation to package names of one or more categorized applications, and determining a likelihood the unknown application includes malware based at least in part on analyzing the package name of the unknown application.

20 Claims, 6 Drawing Sheets

(56) References Cited

U.S. PATENT DOCUMENTS

| | | | | |
|---|---|---|---|---|
| 2010/0313266 | A1* | 12/2010 | Feng | G06F 21/566 |
| | | | | 726/23 |
| 2011/0066908 | A1* | 3/2011 | Bartz | G06F 11/0709 |
| | | | | 714/746 |
| 2011/0138185 | A1* | 6/2011 | Ju | G06F 21/10 |
| | | | | 713/171 |
| 2011/0214114 | A1* | 9/2011 | Vidal | G06F 8/71 |
| | | | | 717/170 |
| 2011/0246964 | A1* | 10/2011 | Cox, III | G06F 8/71 |
| | | | | 717/122 |
| 2012/0054733 | A1* | 3/2012 | Vidal | G06F 8/61 |
| | | | | 717/171 |
| 2012/0079596 | A1* | 3/2012 | Thomas | G06F 21/55 |
| | | | | 726/24 |
| 2012/0117234 | A1* | 5/2012 | Miryanov | G06F 8/60 |
| | | | | 709/224 |
| 2013/0227679 | A1* | 8/2013 | Biton | G06F 21/51 |
| | | | | 726/20 |
| 2013/0227683 | A1* | 8/2013 | Bettini | G06F 21/57 |
| | | | | 726/22 |
| 2013/0347094 | A1* | 12/2013 | Bettini | H04L 63/0245 |
| | | | | 726/11 |
| 2014/0123319 | A1* | 5/2014 | Porjo | G06F 21/6218 |
| | | | | 726/28 |
| 2014/0298460 | A1* | 10/2014 | Xue | H04L 63/1425 |
| | | | | 726/23 |
| 2015/0281217 | A1* | 10/2015 | Petrov | H04L 63/0876 |
| | | | | 726/10 |
| 2015/0304351 | A1* | 10/2015 | Oberheide | H04L 63/1433 |
| | | | | 726/25 |
| 2015/0317479 | A1* | 11/2015 | Jiang | G06F 21/56 |
| | | | | 726/23 |
| 2016/0065534 | A1* | 3/2016 | Liu | G06F 16/248 |
| | | | | 707/728 |
| 2016/0094538 | A1* | 3/2016 | Dabbiere | G06F 21/57 |
| | | | | 726/8 |
| 2016/0099956 | A1* | 4/2016 | Amit | H04L 63/1416 |
| | | | | 726/23 |
| 2016/0294852 | A1* | 10/2016 | Hagen | H04L 63/1425 |
| 2016/0352772 | A1* | 12/2016 | O'Connor | H04L 63/1483 |
| 2017/0091482 | A1* | 3/2017 | Sarin | G06F 21/6245 |
| 2017/0123622 | A1* | 5/2017 | Koenders | G06F 3/0414 |

OTHER PUBLICATIONS

Park, J.H., Kim, M., Noh, B.N. and Joshi, J.B., Sep. 2006. A similarity based technique for detecting malicious executable files for computer forensics. In Information Reuse and Integration, 2006 IEEE International Conference on (pp. 188-193). IEEE.*

Why do a majority of Android package names begin with com?; Varun Khaneja; Quora; Jan. 15, 2011 (Year: 2011).*

Why is reverse DNS notation used for package naming? SimoV8; Stack Overflow; Aug. 10, 2015 (Year: 2015).*

Bundle ID and Package Name; Emmanuel; https://doc.siberiancms.com/knowledge-base/bundle-id-and-package-name; Aug. 16, 2015 (Year: 2015).*

How to organize development and production apps for distribution; HockeyApp Support; Aug. 5, 2015 (Year: 2015).*

How to Submit an App to the App Store; Ludmilla Sivanathan; Clearbridge mobile; May 26, 2015 (Year: 2015).*

Fedler, Rafael, Julia Schutte, and Marcel Kulicke. "On the Effectiveness of Malware Protection on Android." Fraunhofer Research Institution for Applied and Integrated Security, Apr. 2013: https://www.aisec.fraunhofer.de/content/dam/aisec/Dokumente/Publikationen/Studien_TechReports/deutsch/042013-Technical-Report-Android-Virus-Test.pdf. Accessed Aug. 14, 2018.

Kang, Hyunjae, Jae-Wook Jang, Aziz Mohaisen, and Huy Kang Kim. "Detecting and Classifying Android Malware Using Static Analysis Along With Creator Information." Hindawi Publishing Corporation: International Journal of Distributed Sensor Networks, vol. 2015, Article ID 479174: http://dx.doi.org/10.1155/2015/479174. Accessed Aug. 14, 2018.

Jiang, Xuxian. "An Evaluation of the Application ('App') Verification Service in Android 4.2." Dept. of Computer Science, NC State University, Dec. 10, 2012: https://www.csc2.ncsu.edu/faculty/xjiang4/appverify/. Accessed Aug. 14, 2018.

* cited by examiner

DETECTING MALICIOUS SOFTWARE

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

In some cases, software applications may be considered malicious software ("malware"). Malware may be any type of hostile or intrusive software (e.g., a virus, spyware, etc.). It may be difficult to determine which applications contain malware and which do not. It is estimated that only a small percentage of applications may contain malware, and thus it is not efficient or practical to block all unknown applications in order to avoid malware. Thus, a method of detecting malware is beneficial.

SUMMARY

According to at least one embodiment, a method for detecting malicious software is described. In some embodiments, the method may include identifying an unknown application on mobile device, identifying a package name of the unknown application, analyzing the package name of the unknown application in relation to package names of one or more categorized applications, and determining a likelihood the unknown application includes malware based at least in part on analyzing the package name of the unknown application.

An apparatus for detecting malicious software is described. The apparatus may include a processor, memory in electronic communication with the processor, and instructions stored in the memory. The instructions may be executable to identify an unknown application on mobile device, identify a package name of the unknown application, analyze the package name of the unknown application in relation to package names of one or more categorized applications, and determine a likelihood the unknown application includes malware based at least in part on analyzing the package name of the unknown application.

A non-transitory computer-readable medium for detecting malicious software is described. The non-transitory computer-readable medium may include instructions to cause a process to identify an unknown application on mobile device, identify a package name of the unknown application, analyze the package name of the unknown application in relation to package names of one or more categorized applications, and determine a likelihood the unknown application includes malware based at least in part on analyzing the package name of the unknown application.

In some embodiments, the method, apparatus, and/or non-transitory computer readable medium may include comparing at least a portion of the package name of the unknown application to at least a portion of a package name of a known-malware application and determining, based on the comparing, a first string metric between the portion of the package name of the unknown application and the portion of the package name of the known-malware application.

In some embodiments, the method, apparatus, and/or non-transitory computer-readable medium may include determining the first string metric may include determining an edit distance. In some embodiments, determining the edit distance may include determining a number of character changes between character strings of package names being compared.

In some embodiments, the method, apparatus, and/or non-transitory computer-readable medium may include categorizing the unknown application as likely malware upon determining the first metric satisfies a predetermined threshold.

In some embodiments, the method, apparatus, and/or non-transitory computer-readable medium may include comparing at least a portion of the package name of the unknown application to at least a portion of a package name of a known-clean application and determining, based on the comparing, a second string metric between the portion of the package name of the unknown application and the portion of the package name of the known-clean application.

In some embodiments, the method, apparatus, and/or non-transitory computer-readable medium may include, upon determining the first string metric satisfies the predetermined threshold and the second string metric fails to satisfy the predetermined threshold, categorizing the unknown application as likely malware. The method comprises performing malware scan on the unknown application upon categorizing the unknown application as likely malware.

In some embodiments, the method, apparatus, and/or non-transitory computer-readable medium may include, upon determining the first string metric satisfies the predetermined threshold and the second string metric satisfies the predetermined threshold or upon determining the first string metric fails to satisfy the predetermined threshold and the second string metric fails to satisfy the predetermined threshold, categorizing the unknown application as indeterminate.

In some embodiments, the method, apparatus, and/or non-transitory computer-readable medium may include, upon determining the first string metric fails to satisfy the predetermined threshold and the second string metric satisfies the predetermined threshold, categorizing the unknown application as likely malware free.

In some embodiments, the method, apparatus, and/or non-transitory computer-readable medium may include monitoring the unknown application for at least a predetermined time period upon categorizing the unknown application as indeterminate or likely malware free.

In some embodiments, the method, apparatus, and/or non-transitory computer-readable medium may include wherein the package name includes a reverse domain name service connotation, including a top level domain portion, a domain name portion, and a subdomain name portion, and wherein the package name is a globally unique identifier.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to comparing and analyzing package names associated with software applications in order to detect potentially malicious or malicious software ("malware"). Malware may comprise computer viruses, worms, spyware, adware, Trojan horses, ransomware, rootkits, adware, scareware, and the like. Malware may allow unauthorized access to personal information by, for example, logging keystrokes or monitoring the activity on the computing device. Malware may also hijack a user's data and only release the data to the user upon payment of a fee. In some embodiments, analyzing package names associated with software application files, and comparing the package names with known malware, may aid in detecting malware files.

In one embodiment, a software application running on an operating system (e.g., the ANDROID® operating system owned by Google Inc., WINDOWS® operating system owned by Microsoft, Inc.) is identifiable by a globally-unique identifier. In one embodiment, the unique identifier may be known as a "package name" (i.e., when used in the ANDROID® operating system). In some embodiments, the package name may be referred to as a "bundle identifier" if the package name is associated with, for example, the iOS operating system owned by Apple, Inc. For brevity, the unique identifier will be referred to as a "package name" and the environment in which the following methods and systems will be described will be with respect to the ANDROID® operating system; however, the following discussion is not limited to the ANDROID® operating system and may be applied to any unique identifier and any operating system.

The package name is an identifier that uniquely identifies the application with which the package name is associated. More specifically, once the application is created with a specific package name, the package name cannot be changed. The package name is permanently associated with the specific application for which the package name was originally associated. Altering the package name and associating the altered package name with the same software code of the original application creates a new application, the new application associated with the altered package name.

By way of example, in order to create an update to the application, or to create a new version, each updated application or new version will be associated with a new and unique package name. In some embodiments, the package name may use a reverse domain name service (DNS) connotation, including a top level domain portion, a domain name portion, and a subdomain name portion. For example, a first, alpha version of an application may be associated with the package name "com.symantec.alpha." A second, beta version of the application may be associated with the package name "com.symantec.beta." Once the name is established, any attempt to associate an established package name with a new application will generate an error.

In some embodiments, some package names are known to be associated with malware. Once the malware application has been detected, the malware application may be added to a "known-bad" list (e.g., a malware list, a black list, etc.). For example, it has been previously determined the package name "com.malware.virus" is associated with a malware application. Thus, the "com. malware.virus" application is added to the "known-bad" list. In another example, it has been previously determined the package name "com.symantec.good" is associated with a "known-good" application. Thus, the package name "com.symantec.good" may be added to a "known-good" list (e.g., clean application list, white list, clean list, etc.). In the case an application is associated with a package name, but the application is not known to be malware or not, a comparison of the unknown package name with known malware package names and/or known clean package names may yield an indicator as to whether the unknown application is malware or not. More specifically, package names associated with malware may be substantially similar to package names previously determined to be associated with applications containing malware.

Figure 1:
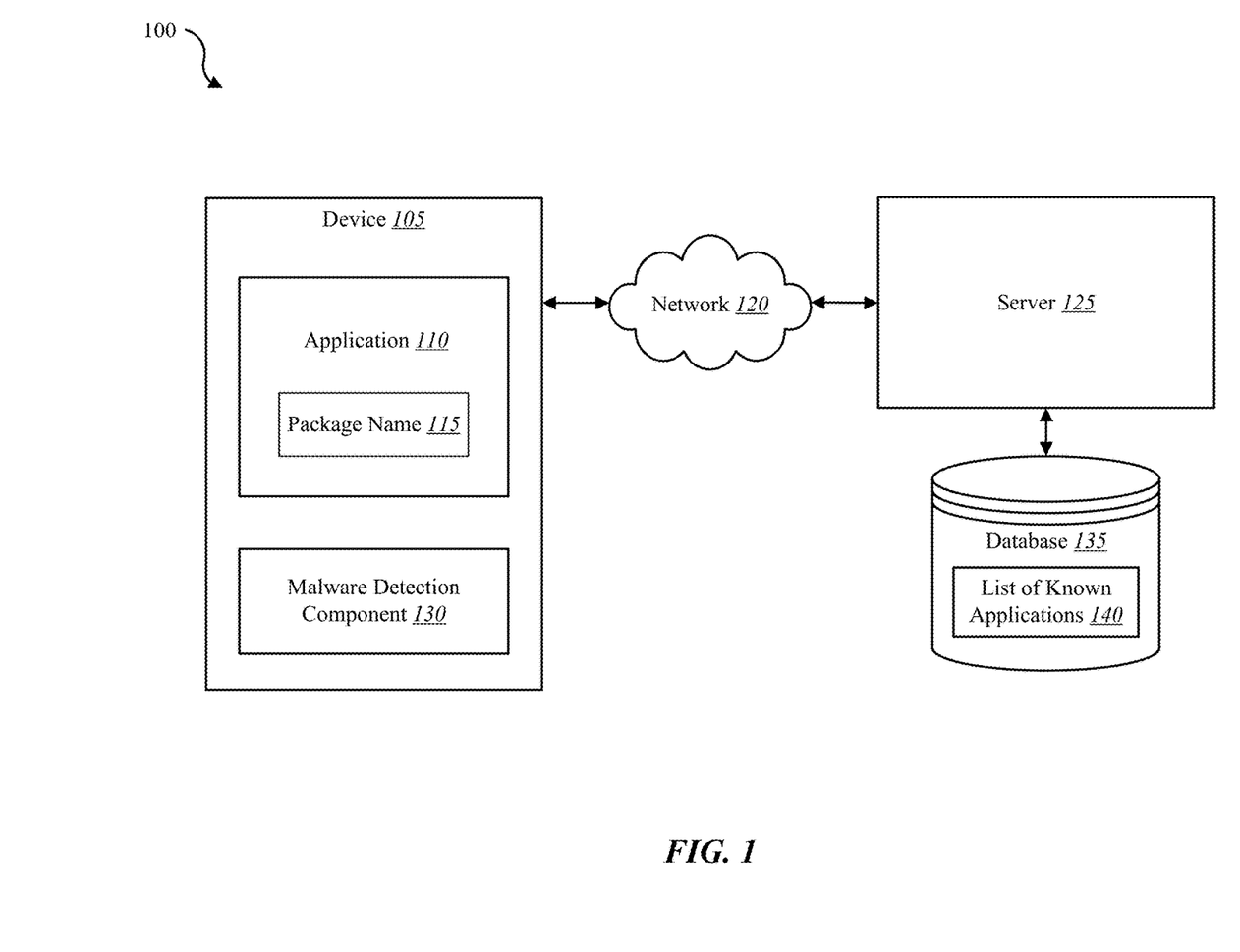
FIG. 1 is a block diagram illustrating one embodiment of an environment in accordance with at least some embodiments.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include device 105, where application 110 has been downloaded onto device 105, and where application 110 is associated with a unique package name 115. Examples of the device 105 may include any of a mobile device, smart phone, personal computing device, computer, laptop, desktop, server, media content set top box, satellite set top box, cable set top box, DVR, personal video recorders (PVR), etc.

Server 125 may include any combination of a data server, a cloud server, a server associated with an automation service provider, proxy server, mail server, web server, application server, database server, communications server, file server, home server, mobile server, name server, etc. In some embodiments, the server may include database 135. In some configurations, the database 135 may keep a list of known applications 140, a record of the "known-bad" package names, "known-good" package names, "unknown" or "indeterminate" package names, etc. Although depicted as being connected to or a part of server 125, in some cases, database 135 may be connected to or a part of device 105.

In some embodiments, both server 125 and device 105 may include a database containing a list of known applications 140 such as database 135.

Network 120 may enable the device 105 to communicate with other devices, as well as enables device 105 to communicate with server 125. In some cases, network 120 may be one of a plurality of wired and/or wireless networks, for example networks where nodes communicate with one another as in a mesh network.

As illustrated, the device 105 may include a malware detection component 130. In some embodiments, malware detection component 130 may enable estimation and/or detection of malicious software files based at least in part on a comparison of a unique package name associated with each software application. Further details regarding the malware detection component 130 are discussed in more detail below.

Figure 2:
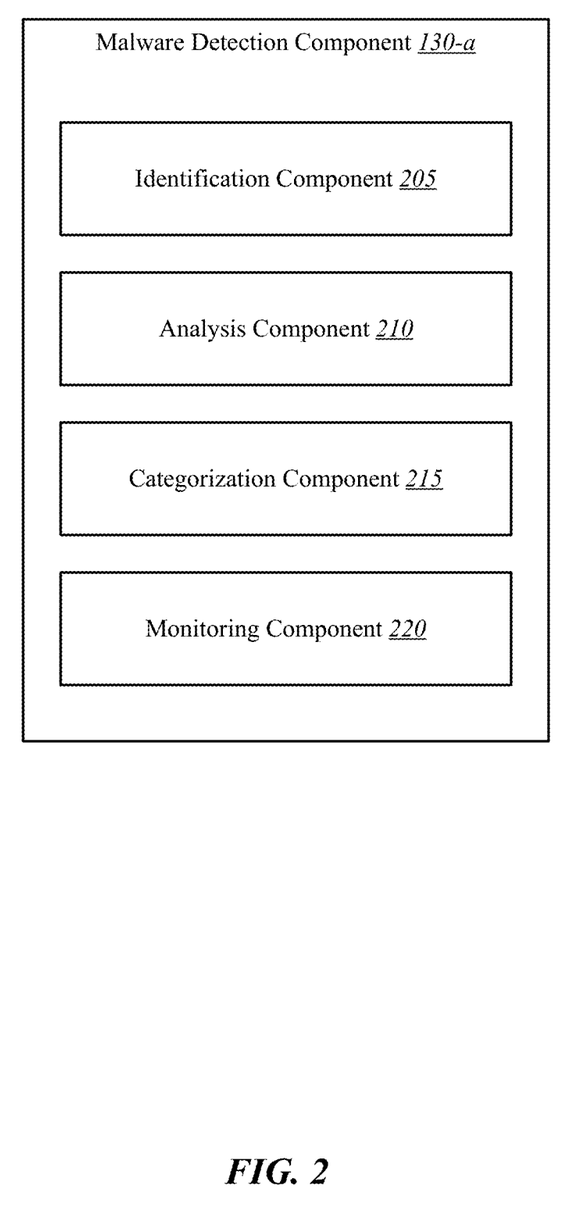
FIG. 2 is a block diagram illustrating a malicious software detection component in accordance with at least some embodiments.

FIG. 2 is a block diagram illustrating one example of a malware detection component 130-a. Malware detection component 130-a may be one example of malware detection component depicted in FIG. 1. In one embodiment, malware detection component 130-a may include identification component 205, analysis component 210, categorization component 215, and monitoring component 220.

In one embodiment, identification component 205 may identify an unknown application which has been downloaded onto or otherwise installed on mobile device 105. In some cases, the unknown application may be downloaded onto the mobile device 105, but not installed. Alternatively, the unknown application may not be downloaded or installed on the mobile device 105, but instead may be selected from an application distribution system, enabling the mobile device 105 to determine a package name of the application from the application distribution system without first downloading or installing the application on the mobile device 105.

In addition, identification component 205 may determine the package name associated with the unknown application. For example, the identification component 205 may parse the code contained within a package file in order to determine the package name associated with the unknown application. In one embodiment, the package file may be an ANDROID® application package ("apk") file format which is used by the ANDROID® operation system. In other embodiments, the package name may be identified by way of parsing another software package used by alternative operating systems.

Analysis component 210 may analyze the package name of the unknown application in relation to the package names of one or more previously known and categorized applications. In one embodiment, for each unknown application which is identified as known-clean or known-bad, the package name associated with the identified application may be stored in memory (e.g., a database in local storage such as database 135 of FIG. 1, in remote storage, in the cloud, etc.). In some embodiments, the list of known-clean package names and associated applications may be known as a "white list." Similarly, the list of known-bad package names and associated applications may be known as a "black list." For each new application downloaded onto a mobile device, the analysis component will analyze the new and unknown package name in relation to the previously determined package names stored in the white list and/or the black list.

In analyzing the package names, the analysis component 210 may determine a likelihood that the unknown application includes malware. In some embodiments, the analysis component may determine whether the application is clean, contains malware, or whether the analysis cannot make a determination at that time. Subsequently, the unknown package name may thus be categorized as "known-clean," "known-bad," or "indeterminate." A more detailed explanation of the analysis of the package names is provided with respect to FIG. 3.

Figure 3:
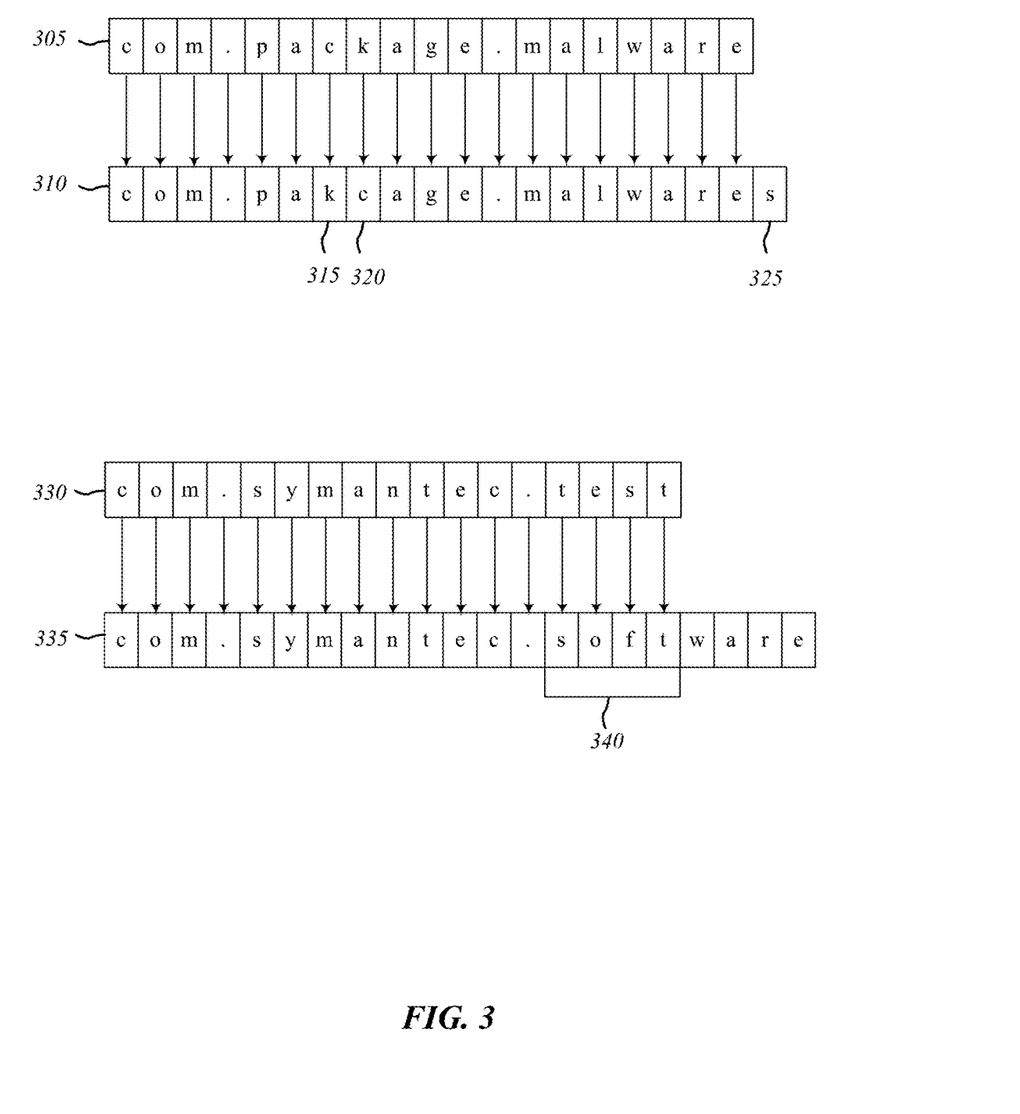
FIG. 3 is an example illustration of string comparison in accordance with at least some embodiments.

FIG. 3 shows an illustrative example of comparing package names in accordance with at least some embodiments. In one embodiment, analysis component 210 described in FIG. 2 may perform at least some of the methods described with respect to FIG. 3. Analysis component 210 may compare at least a portion of the package name of the unknown application to at least a portion of the package name of a known-malware application. In some cases, the known-malware application may be one of the previously known and categorized applications analyzed by the analysis component, as previously described.

In one embodiment, an analysis of the package names is enabled by way of the analysis component 210 executing an algorithm to determine a string metric. In particular, a string metric determine the distance between two text strings to compare the similarity between the elements of a string of text. For example, analysis module 210 may compare the string "Symantec" with the string "Sym" and determine a string metric based on the comparison, such as a similarity or lack of similarity between the two text strings. In some example embodiments, the string metric employed by the analysis component 210 may be the Levenshtein Distance, for example, which operates between two input strings, and returns a number equivalent to the number of insertions, substitutions and/or deletions needed in order to transform one string into another string.

In a first example, package name 305 corresponds to the text string "com.package.malware." In this example, package name 305 has been previously determined to be associated with malware. An unknown application is downloaded on to mobile device 105, and the package name 310 is identified (such as by identification component 205) with the unknown application. Package name 310 corresponds to the text string "com.pakcage.malwares." In this example, three substitutions are determined between the "known-bad" package name 305 and the unknown package name 310: characters 315, 320, and 325, which correspond to letters "k," "c" and "s," respectively.

In FIG. 3, package name 310 has an edit distance of three (3) (i.e., corresponding to the three substitutions). In one example, the analysis component 210 may determine that any unknown package name having an edit distance within a predetermined threshold of a known malware application is likely to be malware (e.g., a determined edit distance of three or less when the threshold is 3). Thus, in this first example, the unknown application associated with package name 310 may be categorized as likely malware having an edit distance of three when the predetermined threshold is 3. As a result, malware detection component 130 may perform a malware scan on the unknown application. In some embodiment, the categorization is enabled by categorization component 215 shown in FIG. 2. On the other hand, if the edit distance between the package names 305 and 310 exceeds the given edit distance threshold (e.g., a determined edit distance of four or more with a threshold of 3), then categorization component 215 may categorize the package name 335 as unknown. Although a threshold edit distance of 3 is used in this example, the threshold edit distance may be any number.

In a second example, also shown in FIG. 3, package name 330 corresponds to the text string "com.symantec.test." In this example, package name 330 has been previously determined to be associated with a clean application. An unknown application is downloaded on to mobile device 105, and the package name 335 is identified as associated with the unknown application. Package name 335 corresponds to the text string "com.symantec.software." In this example, four substitutions 340 are determined (i.e., letters "s," "o," "f," and "t") as well as the addition of four letters "w" "a" "r" and "e" for a total of 8 differences or an edit distance of 8. In some embodiments, the analysis component 210 may determine that any unknown package name having an edit distance within a predetermined threshold of a known clean application is likely to be clean (e.g., a determined edit distance of three or less when the threshold is 3). Thus, in this second example, the unknown application associated with package name 335 may be categorized by the categorization component 215 as indeterminate or unknown because the edit distance of 8 between the package name 330 of the known clean application and the package name 335 of the unknown application exceeds the example edit distance threshold of 3. As a result, the monitoring component 220 may monitor the unknown application to determine whether the application can be trusted. On the other hand, if the edit distance between the package names 330 and 335 was below a given edit distance threshold (e.g., edit distance of three or less with a threshold of 3), then categorization component 215 may categorize the package name 335 as likely clean.

In some cases, the package name 335 of the unknown application may be compared to the package name 305 of the known bad application. In this case, the analysis component 210 may determine that an edit distance of 16 exists between "com.symantec.software" package name 335 and "com.package.malware" package name 305. The edit distance of 16 when compared to the known bad package name and edit distance of 8 when compared to the known good package name may indicate the unknown package name is indeterminate, resulting in monitoring of the application. On the other hand, identification component 205 may identify a reverse domain name service connotation in the package name 335 (com.symantec.software). For example, identification component 205 may identify a top level domain portion ("com"), a domain name portion ("symantec"), and a subdomain name portion ("software") from the package name 335 "com.symantec.software." In some embodiments, based on these identifications, analysis module 210 may identify one or more common strings between the known package name and the unknown package name. For example, analysis module 210 may determine that both package names 330 and 335 have matching top local domain portions (both include "com" as the top local domain portion), and that both 330 and 335 have matching domain name portions (both include "symantec" as the domain name portion). Based on these two matching portions, in some embodiments, analysis module 210 may determine that the unknown package name 335 is likely clean. In some embodiments, the newly categorized applications and package names may be stored in the appropriate known-bad, known-clean, or indeterminate lists for future analysis on later unknown applications.

A pseudo-code example showing a determination of edit distance between two package names is shown below in Table 1.

TABLE 1

```
def can_transform(pkg1, pkg2):
    if edit_distance (pkg1, pkg2) <= 3
        return False
def our_convict(incoming_package):
    for d in all_good_packages:
        if can_transform (incoming_package), d):
            return 'Indeterminate'
    print 'Not transformable to clean package'
    for d in all_bad_packages:
        if can_transform(incoming_package, d):
            return 'Probably malware'
```

In some embodiments, after the unknown application has been categorized as indeterminate or likely clean, the monitoring component 220 may monitor the indeterminate/likely clean application package name to determine if any changes would cause the categorization component 215 to categorize the application as being malware.

Figure 4:
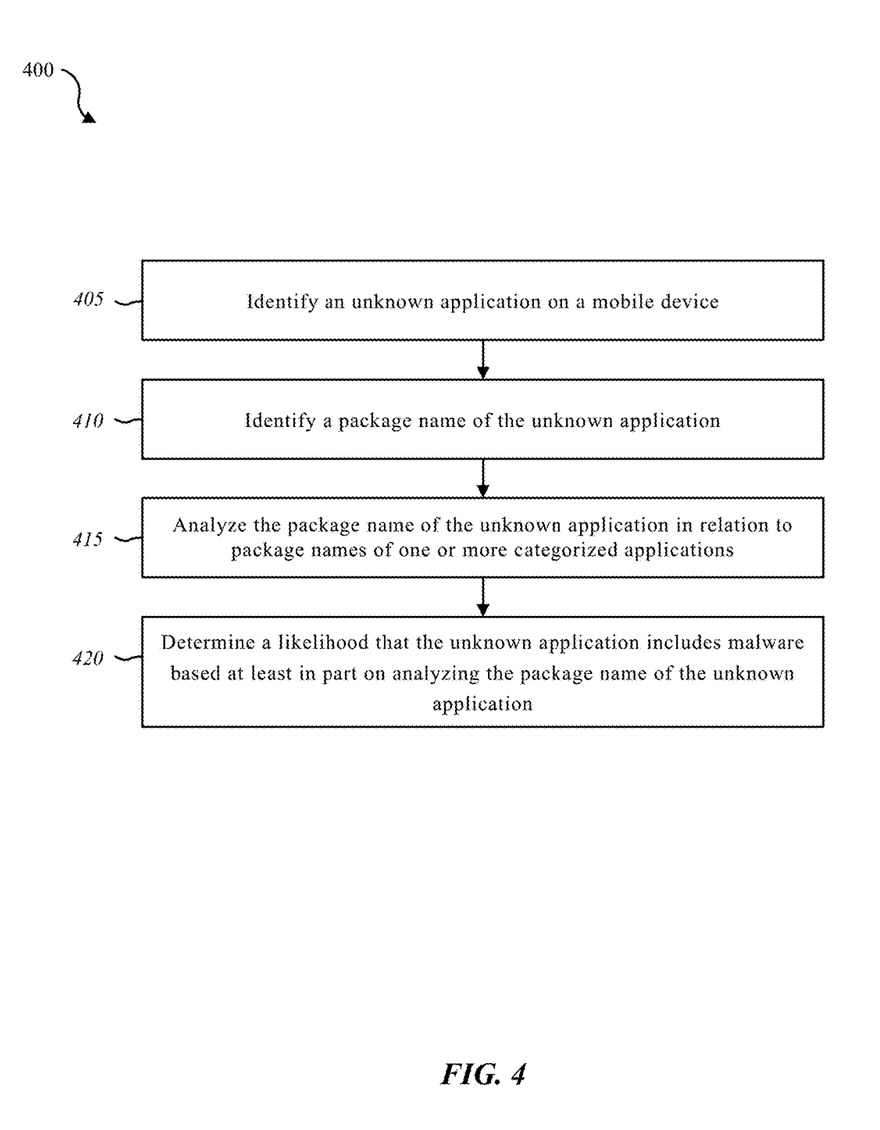
FIG. 4 is a flow diagram illustrating one embodiment of a method for sharing data based on user ranking.

FIG. 4 depicts a flow diagram illustrating one embodiment of a method 400 for detecting malware in accordance with at least some embodiments. In some configurations, the method 400 may be implemented by the malware detection component 130 illustrated in FIGS. 1 and/or 2.

At block 405, an unknown application located on a mobile device may be identified. At block 410, a package name associated with the unknown application may be identified. At block 415, the package name of the unknown application may be analyzed in relation to at least one package name of a previously categorized application. At block 420, a likelihood that the unknown application includes malware based at least in part on analyzing the package name of the application is determined.

Figure 5:
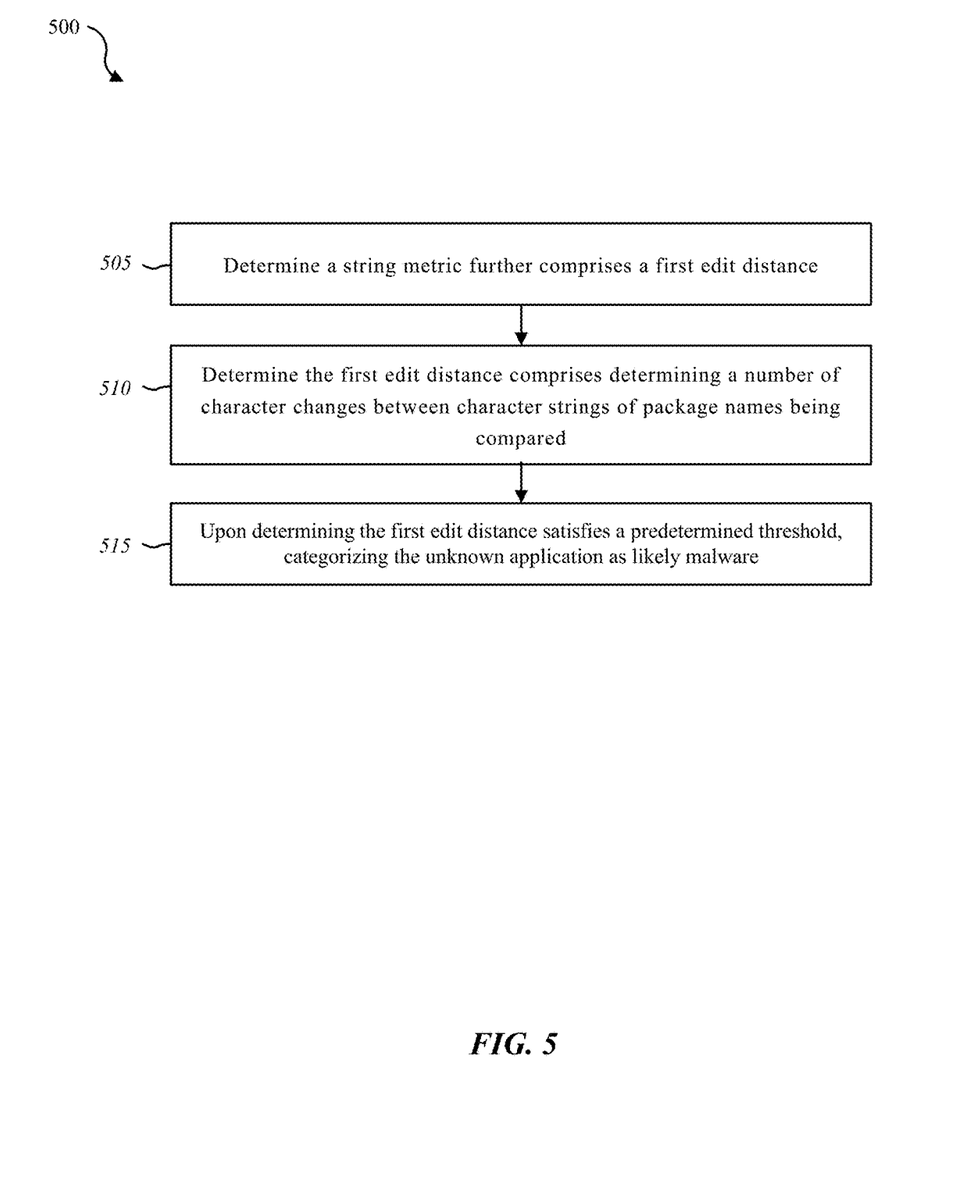
FIG. 5 is a flow diagram illustrating one embodiment of a method for sharing data based on user ranking.

FIG. 5 depicts a flow diagram illustrating one embodiment of a method 500 for detecting malware in accordance with at least some embodiments. In some configurations, the method may be implemented by the malware detection component 130 illustrated in FIGS. 1 and/or 2. Method 500 may be implemented in conjunction with method 400 as previously described with reference to FIG. 4. At block 505, the method may determine a string metric comprises a first edit distance. At block 510, the method may determine the first edit distance comprises determining a number of character changes between character strings of package names being compared. At block 515, upon determining the first edit distance satisfies a predetermined threshold, the method may categorize the unknown application as likely malware.

Figure 6:
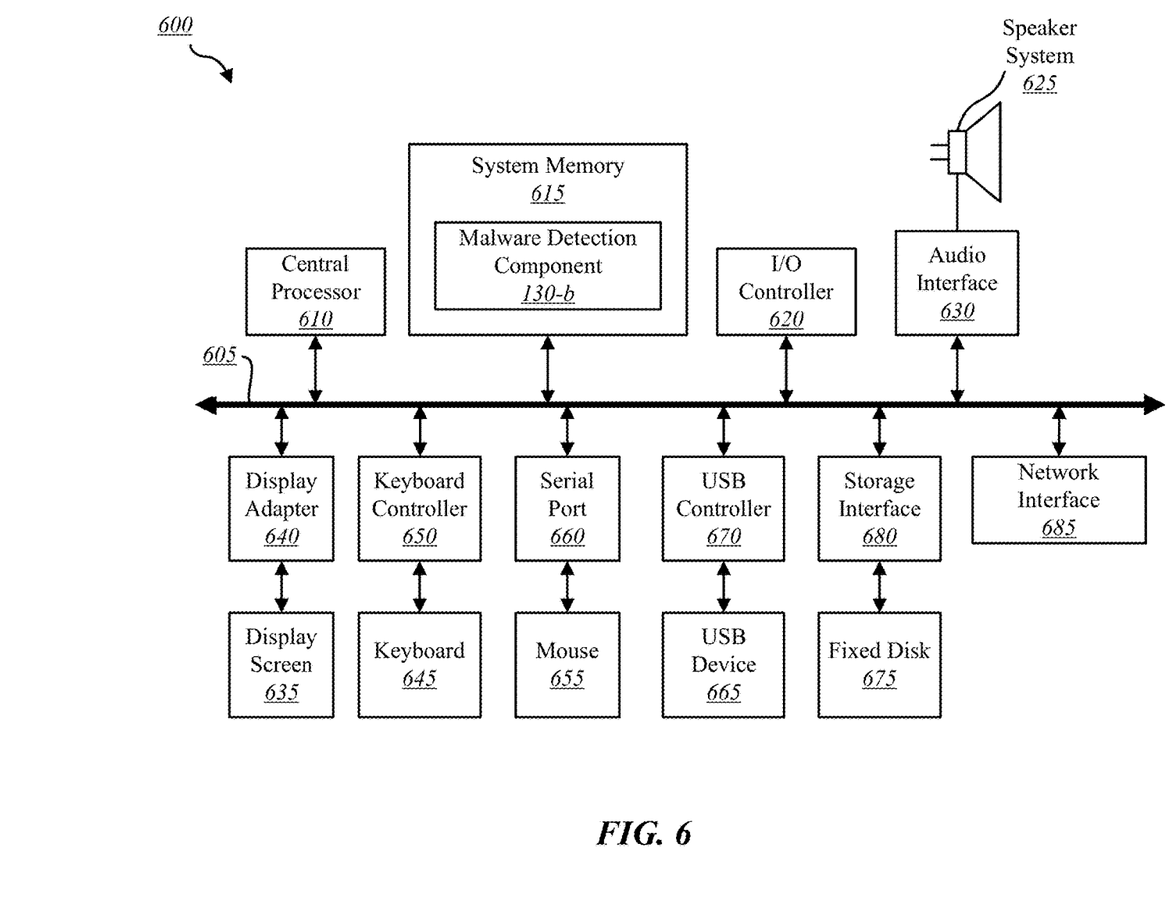
FIG. 6 is a block diagram of a computer system suitable for implementing the present systems and methods.

FIG. 6 depicts a block diagram of a computer system 600 suitable for implementing the present systems and methods in accordance with at least some embodiments. The computer system 600 may be an example of device 105, illustrated in FIG. 1. In one configuration, computer system 600 includes a bus 605 which interconnects major subsystems of computer system 600, such as a central processor 610, a system memory 615 (Random Access Memory ("RAM"), read-only memory ("ROM"), flash RAM, etc.), an input/output computer system 620, an external audio device, such as a speaker system 625 via an audio output interface 630, an external device, such as a display screen 635 via display adapter 640, input devices such as a keyboard 645 and/or mouse 655 (e.g., interfaced with keyboard computer system 650 and serial port 660, respectively), multiple USB devices 665 (interfaced with a USB computer system 670), and a storage interface 680. In some embodiments, the keyboard may be a physical tactile input device, while in other embodiments the keyboard may be present as part of a touchscreen (such as a capacitive touchscreen). In some embodiments, computer system 600 may include a transceiver that includes a transmitter, a receiver, and at least one antenna.

Bus 605 allows data communication between central processor 610 and system memory 615. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the malware detection component 130-*b* which may implement the present systems and methods may be stored within the system memory 615. The malware detection component 130-*b*, and other software applications, resident with computer system 600 may be stored on and accessed via a non-transitory computer readable medium, such as a hard disk drive (e.g., fixed disk 675) or other storage media. Additionally, applications can be in the form of electronic signals modulated in accordance with the application and data communication technology when accessed via network interface 685.

Storage interface 680, as with the other storage interfaces of computer system 600, can connect to a standard computer readable medium for storage and/or retrieval of information, such as a fixed disk drive 675. Fixed disk drive 675 may be a part of computer system 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to computer system 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 715 or fixed disk 775. The operating system provided on computer system 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method comprising:

identifying an unknown application on a mobile device;

identifying a reverse domain name service connotation associated with the unknown application, the reverse domain name service connotation including a top level domain portion, a domain name portion, and a subdomain name portion;

identifying a unique package name of the unknown application based at least in part on the top level domain portion or the domain name portion or the subdomain name portion, wherein the unknown application is uniquely associated solely with the unique package name of the unknown application, wherein the unique package name is permanently associated with a latest version of the unknown application and is different from all package names associated with prior versions of the unknown application, a content of the latest version of the unknown application being equal to the content of at least one of the prior versions of the unknown application, the content including a software code of the unknown application;

analyzing the unique package name of the unknown application in relation to a unique package name of a categorized application; and determining a likelihood that the unknown application includes malware based at least in part on the analyzing of the unique package name of the unknown application.

2. The method of claim 1, comprising:

comparing at least a portion of the unique package name of the unknown application to at least a portion of a unique package name of a known-malware application, wherein the known-malware application is uniquely associated with the unique package name of the known-malware application; and determining, based on the comparing, a string metric between the portion of the unique package name of the unknown application and the portion of the unique package name of the known-malware application.

3. The method of claim 2, wherein determining the string metric comprises determining a first edit distance.

4. The method of claim 3, wherein determining the first edit distance comprises determining a number of character changes between character strings of unique package names being compared.

5. The method of claim 3, comprising:

upon determining the first edit distance satisfies a predetermined threshold, categorizing the unknown application as likely malware.

6. The method of claim 5, comprising:

comparing at least a portion of the unique package name of the unknown application to at least a portion of a unique package name of a known-clean application, wherein the known-clean application is uniquely associated with the unique package name of the known-clean application; and determining, based on the comparing, a second edit distance between the portion of the unique package name of the unknown application and the portion of the unique package name of the known-clean application.

7. The method of claim 6, comprising:

upon determining the first edit distance satisfies the predetermined threshold and the second edit distance fails to satisfy the predetermined threshold, categorizing the unknown application as likely malware.

8. The method of claim 7, comprising:

performing a malware scan on the unknown application upon categorizing the unknown application as likely malware.

9. The method of claim 6, comprising:

upon determining the first edit distance satisfies the predetermined threshold and the second edit distance satisfies the predetermined threshold or upon determining the first edit distance fails to satisfy the predetermined threshold and the second edit distance fails to satisfy the predetermined threshold, categorizing the unknown application as indeterminate.

10. The method of claim 9, comprising:

upon determining the first edit distance fails to satisfy the predetermined threshold and the second edit distance satisfies the predetermined threshold, categorizing the unknown application as likely malware free.

11. The method of claim 10, comprising:

monitoring the unknown application for at least a predetermined time period upon categorizing the unknown application as indeterminate or likely malware free.

12. The method of claim 1, wherein the unique package name is a globally unique identifier (GUID).

13. An apparatus comprising:

a processor;

memory in electronic communication with the processor;

instruction stored in the memory, wherein the instructions cause the processor to:

identify an unknown application on a mobile device;

identify a reverse domain name service connotation associated with the unknown application, the reverse domain name service connotation including a top level domain portion, a domain name portion, and a subdomain name portion;

identify a unique package name of the unknown application based at least in part on the top level domain portion or the domain name portion or the subdomain name portion, wherein the unknown application is uniquely associated solely with the unique package name of the unknown application and wherein the unique package name is permanently associated with a latest version of the unknown application and is different from all package names associated with prior versions of the unknown application, a content of the latest version of the unknown application being equal to the content of at least one of the prior versions of the unknown application, the content including a software code of the unknown application;

analyze the unique package name of the unknown application in relation to a unique package name of a categorized application; and determine a likelihood that the unknown application includes malware based at least in part on the analyzing of the unique package name of the unknown application.

14. The apparatus of claim 13, wherein the instructions cause the processor to:

compare at least a portion of the unique package name of the unknown application to at least a portion of a unique package name of a known-malware application, wherein the known-malware application is uniquely associated with the unique package name of the known-malware application; and determine, based on the comparing, a string metric between the portion of the package name of the unknown application and the portion of the package name of the known-malware application.

15. The apparatus of claim 14, wherein when the processor determines the string metric, the instructions cause the processor to determine a first edit distance.

16. The apparatus of claim 15, wherein when the processor determines the first edit distance, the instructions cause the processor to determine a number of character changes between character strings of unique package names being compared.

17. The apparatus of claim 15, upon determining the first edit distance satisfies a predetermined threshold, the instructions cause the processor to:
categorize the unknown application as likely malware.

18. The apparatus of claim 17, wherein the instructions cause the processor to:
compare at least a portion of the unique package name of the unknown application to at least a portion of a unique package name of a known-clean application; and
determine, based on the comparing, a second edit distance between the portion of the unique package name of the unknown application and the portion of the unique package name of the known-clean application.

19. The apparatus of claim 18, upon determining the first edit distance satisfied the predetermined threshold and the second edit distance fails to satisfy the predetermined threshold, the instructions cause the processor to:
categorize the unknown application as likely malware.

20. A non-transitory computer-readable medium storing a program that, when executed by a processor, causes the processor to:
identify an unknown application on a mobile device;
identify a reverse domain name service connotation associated with the unknown application, the reverse domain name service connotation including a top level domain portion, a domain name portion, and a subdomain name portion;
identify a unique package name of the unknown application based at least in part on the top level domain portion or the domain name portion or the subdomain name portion, wherein the unknown application is uniquely associated solely with the unique package name of the unknown application and wherein the unique package name is permanently associated with a latest version of the unknown application and is different from all package names associated with prior versions of the unknown application, a content of the latest version of the unknown application being equal to the content of at least one of the prior versions of the unknown application, the content including a software code of the unknown application;
analyze the unique package name of the unknown application in relation to a unique package name of a categorized application; and
determine a likelihood that the unknown application includes malware based at least in part on the analyzing of the unique package name of the unknown application.

* * * * *